(12) United States Patent
Yamaguchi et al.

(10) Patent No.: US 10,352,279 B2
(45) Date of Patent: Jul. 16, 2019

(54) CONSTRUCTION MACHINE

(71) Applicants: Kobe Steel, Ltd., Kobe-shi (JP);
KOBELCO CONSTRUCTION MACHINERY CO., LTD.,
Hiroshima-shi (JP)

(72) Inventors: Zenzo Yamaguchi, Kobe (JP); Satoshi Tabuchi, Kobe (JP); Kyoko Masuda, Kobe (JP); Shinichi Kinoshita; Kazuhiro Ueda, Hiroshima (JP)

(73) Assignees: Kobe Steel, Ltd., Kobe-shi (JP);
KOBELCO CONSTRUCTION MACHINERY CO., LTD.,
Hiroshima-shi (JP)

( * ) Notice: Subject to any disclaimer, the term of this patent is extended or adjusted under 35 U.S.C. 154(b) by 0 days.

(21) Appl. No.: 15/579,652

(22) PCT Filed: Jun. 6, 2016

(86) PCT No.: PCT/JP2016/066813
§ 371 (c)(1),
(2) Date: Dec. 5, 2017

(87) PCT Pub. No.: WO2016/208372
PCT Pub. Date: Dec. 29, 2016

(65) Prior Publication Data
US 2018/0156167 A1 Jun. 7, 2018

(30) Foreign Application Priority Data
Jun. 24, 2015 (JP) .................... 2015-126715

(51) Int. Cl.
*F02M 35/10* (2006.01)
*B60K 11/04* (2006.01)
(Continued)

(52) U.S. Cl.
CPC ....... *F02M 35/10124* (2013.01); *B60K 11/00* (2013.01); *B60K 11/04* (2013.01);
(Continued)

(58) Field of Classification Search
CPC .... B60K 11/06; B60K 11/08; F01P 2001/005; F01P 11/10; B62D 25/082
See application file for complete search history.

(56) References Cited

U.S. PATENT DOCUMENTS 7,507,270 B2 * 3/2009 Maas ................. B60K 13/02
55/385.3
7,841,314 B2 11/2010 Nakashima et al.
(Continued)

FOREIGN PATENT DOCUMENTS

EP 2 634 031 A1 9/2013
JP 58-183958 U 12/1983
(Continued)

OTHER PUBLICATIONS

International Search Report dated Aug. 30, 2016 in PCT/JP2016/066813 filed Jun. 6, 2016.
(Continued)

*Primary Examiner* — Long T Tran
(74) *Attorney, Agent, or Firm* — Oblon, McClelland, Maier & Neustadt, L.L.P.

(57) ABSTRACT

A construction machine includes: a partition member partitioning an accommodation space in an engine compartment into a main chamber and an intake chamber while having an inter-chamber opening; a fan disposed in the main chamber to generate cooling air flowing through an air intake opening, the intake chamber, the inter-chamber opening, and the main chamber in this order by sucking air in the engine compartment in a suction direction; a duct joined to an outer wall to enclose the air intake opening and including an inner
(Continued)

peripheral surface enclosing a duct passage leading to the air intake opening and an outer peripheral surface. The duct extends in a duct extension direction different from the suction direction of the fan, disposed in the intake chamber to define a duct surrounding space around the outer peripheral surface of the duct.

12 Claims, 12 Drawing Sheets

(51) Int. Cl.
| | |
|---|---|
| E02F 9/00 | (2006.01) |
| F02M 35/14 | (2006.01) |
| F02M 35/12 | (2006.01) |
| F02M 35/16 | (2006.01) |
| B60K 11/00 | (2006.01) |
| B60K 11/08 | (2006.01) |
| B60R 13/08 | (2006.01) |
| F01P 5/06 | (2006.01) |
| F01P 11/12 | (2006.01) |
| F01P 11/10 | (2006.01) |
| F01P 1/00 | (2006.01) |

(52) U.S. Cl.
CPC .......... *B60K 11/08* (2013.01); *B60R 13/0838* (2013.01); *E02F 9/00* (2013.01); *F01P 5/06* (2013.01); *F01P 11/12* (2013.01); *F02M 35/10262* (2013.01); *F02M 35/1205* (2013.01); *F02M 35/14* (2013.01); *F02M 35/164* (2013.01); *F01P 11/10* (2013.01); *F01P 2001/005* (2013.01)

(56) References Cited

U.S. PATENT DOCUMENTS

| | | |
|---|---|---|
| 8,684,116 B2 | 4/2014 | Nakashima |
| 2006/0144350 A1* | 7/2006 | Nakashima ............ B60K 11/08 123/41.01 |
| 2008/0169142 A1* | 7/2008 | Kinoshita .............. B60K 11/08 180/68.1 |
| 2008/0223319 A1* | 9/2008 | Nakashima ............ E02F 9/0866 123/41.66 |
| 2008/0257531 A1* | 10/2008 | D'hondt ............. A01D 41/1252 165/104.34 |
| 2011/0214931 A1 | 9/2011 | Nakashima |
| 2013/0081887 A1* | 4/2013 | Tsuchihashi ........... B60K 11/06 180/68.1 |
| 2013/0228388 A1* | 9/2013 | Ueda ...................... B60K 11/04 180/68.1 |
| 2016/0356018 A1* | 12/2016 | Tabuchi .................. F01P 5/06 |

FOREIGN PATENT DOCUMENTS

| | | |
|---|---|---|
| JP | 5-46528 U | 6/1993 |
| JP | 9-123771 A | 5/1997 |
| JP | 9-150636 | 6/1997 |
| JP | 11-117761 A | 4/1999 |
| JP | 11-240342 A | 9/1999 |
| JP | 2000-16094 A | 1/2000 |
| JP | 2001-301473 A | 10/2001 |
| JP | 2004-36778 A | 2/2004 |
| JP | 2006-206034 A | 8/2006 |
| JP | 2006-207576 A | 8/2006 |
| JP | 2008-261338 A | 10/2008 |
| JP | 2011-208632 A | 10/2011 |
| JP | 2013-104276 | 5/2013 |
| JP | 2013-253374 A | 12/2013 |
| WO | WO 2006/070733 A1 | 7/2006 |

OTHER PUBLICATIONS

Extended European Search Report dated Nov. 15, 2018 in Patent Application No. 16814143.0, 8 pages.

* cited by examiner

CONSTRUCTION MACHINE

TECHNICAL FIELD

The present invention relates to a construction machine including an engine.

BACKGROUND ART

A construction machine including an engine has a problem of noise generated in an engine compartment, especially, the noise generated by a fan (cooling fan) in the engine compartment and emitted outwardly from an air intake opening of the engine compartment. For example, noise around the construction machine (i.e., at a construction site, etc.) and noise at the ear in a cab are problematic.

FIG. 1 of Patent Literature 1 shows a technique of mounting sound absorbers in a cooling air intake duct. FIG. 1 of Patent Literature 2 shows a technique of mounting a sound absorber near an air intake opening. These techniques aim to reduce noise while taking in cooling air through the air intake opening.

Besides, there are some cases of using an interference type muffler, such as a Helmholtz resonator or a side branch, to reduce noise. Patent Literatures 3 and 4 describe about reducing noise by use of a side branch.

The sound absorber disclosed in Patent Literatures 1 and 2, however, can suppress no noise but one having a limited frequency. Specifically, the sound absorber has the ability to suppress high frequency sound (i.e., sound at frequencies higher than 200 Hz), but has little to suppress low frequency sound (i.e., from about 100 Hz to about 200 Hz). In addition, in the case of suppressing the low frequency sound by use of only the interference type muffler, such as a Helmholtz resonator or a side branch disclosed in Patent Literatures 3 and 4, the muffler is required to be large. Such a large muffler is hard to dispose in the engine compartment. For example, the aforementioned side branch requires a length of about 0.425 m to 0.85 m in order to reduce noise of 100 Hz to 200 Hz. Additionally, the muffler cannot exert its noise suppression effect beyond a narrow frequency range.

CITATION LIST

Patent Literature

Patent Literature 1: JP H09-123771 A
Patent Literature 2: JP 2008-261338 A
Patent Literature 3: JP S58-183958 U
Patent Literature 4: JP 2004-036778 A

SUMMARY OF INVENTION

An object of the present invention is to provide a construction machine including an engine compartment having an air intake opening, the construction machine being capable of reducing noise emitted out of the engine compartment through the air intake opening over a wide range of frequencies in a compact configuration.

Provided is a construction machine capable of reducing noise emitted out of the engine compartment through the air intake opening over a wide range of frequencies in a compact configuration. Provided is a construction machine including: an engine; an engine compartment that has an outer wall enclosing an accommodation space and accommodates the engine in the accommodation space; a partition member that partitions the accommodation space into a main chamber accommodating the engine and an intake chamber in communication with an outside of the outer wall through an air intake opening formed in the outer wall, the main chamber and the intake chamber being arranged in a horizontal chamber arrangement direction, the partition member having an inter-chamber opening that provides communication between the main chamber and the intake chamber and has a smaller area than an area of the intake chamber when viewed in the chamber arrangement direction; a fan disposed in the main chamber to suck air in the engine compartment in a suction direction so as to generate cooling air flowing through the air intake opening, the intake chamber, the inter-chamber opening, and the main chamber in this order; and a duct joined to the outer wall so as to enclose the air intake opening, the duct including an inner peripheral surface enclosing a duct passage leading to the air intake opening and an outer peripheral surface. The duct extends in a duct extension direction different from the suction direction and is disposed in the intake chamber so as to define a duct surrounding space around the outer peripheral surface of the duct.

DESCRIPTION OF EMBODIMENTS

There will be described a main part of a construction machine according to a first embodiment of the present invention with reference to FIGS. 1 to 5.

Figure 1:
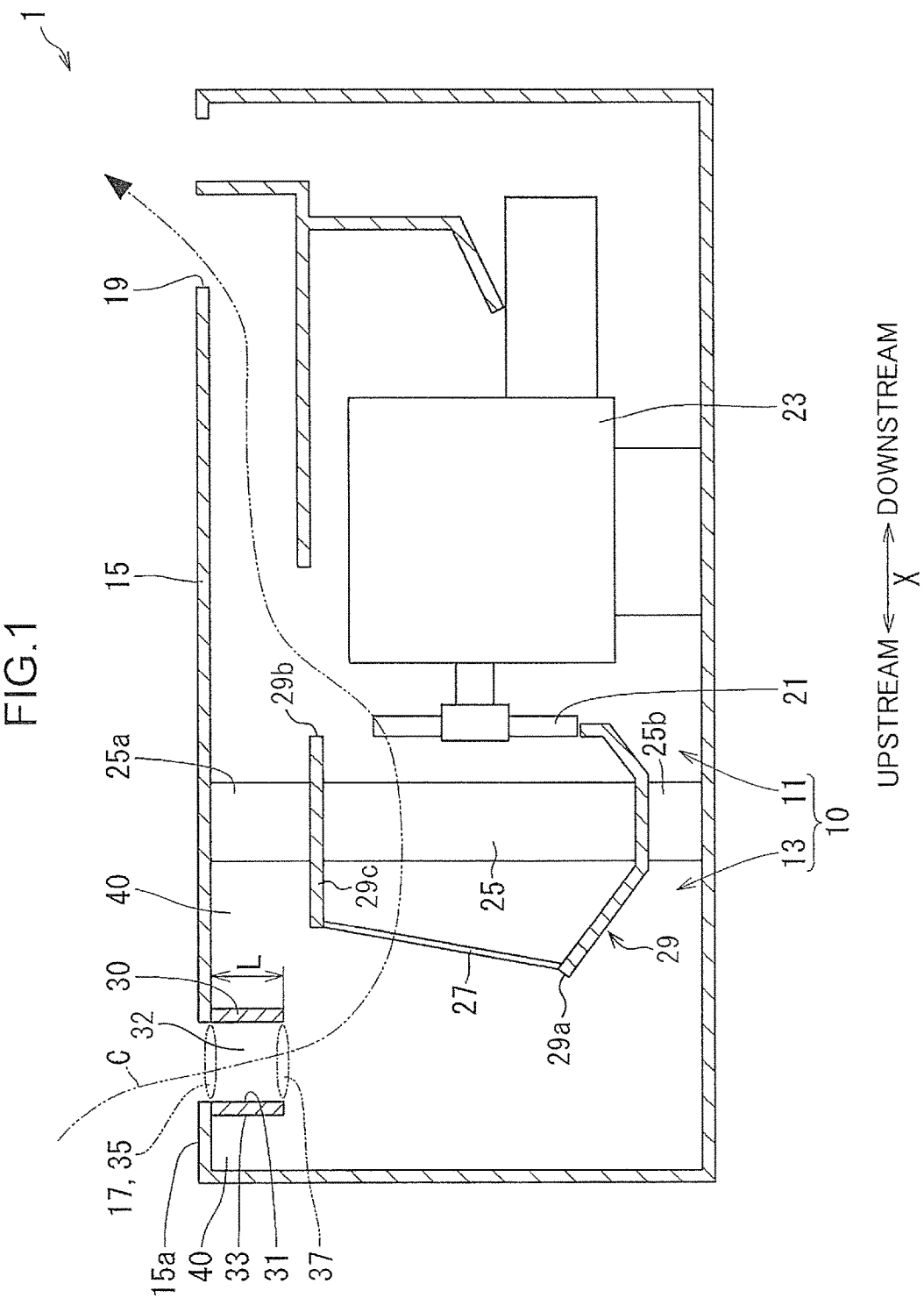
FIG. 1 is a cross-sectional view of a structure in an engine compartment of a construction machine according to a first embodiment of the present invention as seen horizontally.

The construction machine includes an upper slewing body (not shown), an engine 23 shown in FIG. 1, an engine compartment 10 accommodating the engine 23, and a plurality of elements accommodated in the engine compartment 10, the plurality of elements including a partition member.

The engine compartment 10 has a wall portion 15 as an outer wall, the wall portion 15 enclosing an accommodation space to accommodate the engine 23 and others. The engine compartment 10 is disposed in the rear part of the upper slewing body. The partition member partitions the accommodation space into a main chamber 11 and an intake chamber 13 horizontally adjacent to each other. The main chamber 11 accommodates the engine 23 and peripheral elements thereof. The intake chamber 13 is brought into communication with the outside of the wall portion 15 through an air intake opening 17 formed in the wall portion 15. The wall portion 15 is formed, for example, of an engine guard, a part of a counter weight, and others. The wall portion 15 includes an intake-chamber top wall portion 15a configuring the top wall of the intake chamber 13.

Figure 2:
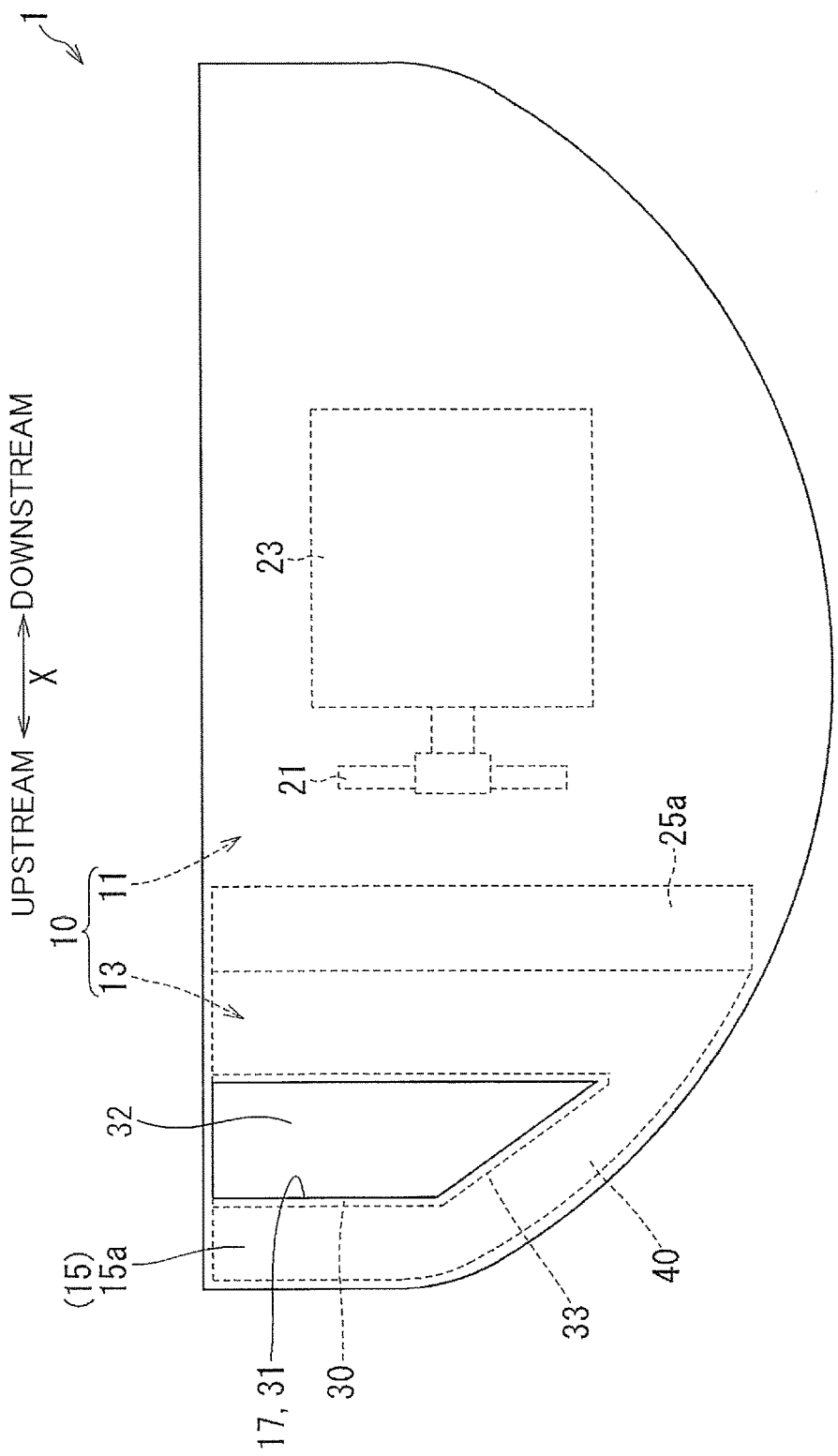
FIG. 2 is a plan view of the engine compartment.

The air intake opening 17 is formed in a part of the wall portion 15, the part enclosing the intake chamber 13, in this embodiment, in the top wall portion. The air intake opening 17 passes through the wall portion 15 to thereby provide communication between the outside of the wall portion 15 and the inside of the intake chamber 13. The air intake opening 17 in this embodiment is formed in the intake-chamber top wall portion 15a. The air intake opening 17 according to this embodiment has a shape of, for example, square, in particular, trapezoid as shown in FIG. 2 when viewed from above. The wall portion 15 includes a part configuring a top wall of the main chamber 11, the part being formed with an exhaust opening 19.

The plurality of elements include a fan 21, a radiator 25, a filter 27, an air guide member 29, and a duct 30.

The fan 21 is disposed in the main chamber 11 and driven by the engine 23 to suck air in the main chamber 11 to thereby generate cooling air C. The direction in which the fan 21 sucks air (i.e., the direction of the cooling air C at the position of the fan 21) is referred to as a fan suction direction X. The fan suction direction X is horizontal or substantially horizontal.

The engine 23 is a power source for the fan 21. The engine 23 is a power source for the construction machine: it is a power source for a hydraulic pump mounted on the engine 23. The engine 23 is disposed in the main chamber 11. The engine 23 is disposed downstream of the fan 21 in the fan suction direction X.

The radiator 25 is a device to cool fluid, which flows in the radiator 25, through heat exchange between the fluid and the cooling air C. The fluid to be cooled by the radiator 25 is, for example, cooling water for the engine 23 and hydraulic oil for operating a hydraulic actuator (not shown).

The radiator 25 is located on the upstream side X1 of the fan 21. The radiator 25 includes a radiator body 25c forming the vertically middle portion of the radiator 25, an upper partition section 25a forming the upper portion of the radiator 25, and a lower partition section 25b forming the lower portion of the radiator 25. The radiator body 25c exchanges heat between the cooling air C and the fluid while allowing the passage of the cooling air C. The upper partition section 25a and the lower partition section 25b partition the accommodation space into the main chamber 11 and the intake chamber 13 at respective upper and lower positions of the radiator body 25c. The present invention may include a member provided separately from the radiator 25 to partition the accommodation space into the main chamber 11 and the intake chamber 13 at positions similar to those of the upper partition section 25a and the lower partition section 25b.

The air guide member 29 constitutes the partition member in cooperation with the radiator 25. The air guide member 29 is a member for guiding the cooling air C so as to properly pass the cooling air C generated by the fan 21 through the radiator body 25c of the radiator 25. The air guide member 29 has a tubular shape penetrating the radiator 25 so as to enclose the radiator body 25a, which is a part of the radiator 25 to allow the cooling air C to pass through the part. The air guide member 29 includes an inlet end 29a located in the intake chamber 13 and an outlet end 29b enclosing the fan 21, extending in the fan suction direction X to interconnect the inlet end 29a and the outlet end 29b. The air guide member 29 has a portion 29c projecting toward the intake chamber 13 beyond the radiator 25, the projecting portion 29c partitioning a space in the vicinity of the radiator 25 into a space inside an intake chamber 13 and outside the air guide member 29 and a space inside the air guide member 29.

The filter 27, which is disposed inside the inlet end 29a of the air guide member 29, collects dust contained in the cooling air C while allowing the cooling air C to pass through the filter 27. The inlet end 29a encloses an inter-chamber opening that provides communication between the main chamber 11 and the intake chamber 13, the inter-chamber opening defining a boundary between the main chamber 11 and the intake chamber 13. The filter 27 is located upstream of the radiator 25 in the fan suction direction X. When viewed in the chamber arrangement direction in which the main chamber 11 and the intake chamber 13 are arranged (e.g., in the fan suction direction X), the inter-chamber opening where the filter 27 is located has an area smaller than an area of the intake chamber 13. More specifically, the filter 27 is disposed so as to put the outline thereof within the outline of the intake chamber 13 when viewed in the chamber arrangement direction.

The duct 30 is a tubular member provided so as to enclose the air intake opening 17 in the intake chamber 13. The duct 30 includes: an inner peripheral surface 31 enclosing a duct passage 32 which is a passage in the duct 30; and an outer peripheral surface 33, the duct passage 32 leading to the air intake opening 17. The duct 30 includes an upper end opening 35 continuous with the air intake opening 17 and a lower end opening 37 away from the upper end opening 35 inward of the intake chamber 13 (i.e., downward in FIG. 1).

The duct 30 is disposed so as to restrict sound from direct emission from the fan 21 to the outside of the engine compartment 10, specifically, so as to make sound emitted from the fan 21 apt to come to the duct 30. The duct 30 extends downward from the air intake opening 17 toward the inside of the intake chamber 13. The direction in which the duct 30 extends is a direction different from the fan suction direction X (i.e., the horizontal direction in this embodiment), specifically, orthogonal to the fan suction direction X. The term "direction orthogonal to" as used herein includes not only a strictly orthogonal direction but also directions which are regarded as substantially orthogonal. The duct 30 extends, for example, straight downward. On the assumption that no element other than the air guide member 29 exists between the duct 30 and the fan 21 in the engine compartment 10, specifically, In the absence of the filter 27 and the radiator 25, it is preferable that the duct 30 is disposed so as to block direct view of the fan 21, from the outside of the engine compartment 10 through the air intake opening 17.

The duct 30 is disposed so as to define a duct surrounding space 40 around the outer peripheral surface 33. The duct surrounding space 40 is a part of the intake chamber 13, having an existence of air but no existence of solid. The duct surrounding space 40 is adjacent to the outer peripheral surface 33. As shown in FIG. 2, the duct surrounding space 40 does not necessarily surround the entire circumference of the outer peripheral surface 33. The duct surrounding space 40 is formed, at least, upstream of the outer peripheral surface 33 in the fan suction direction X and downstream of the outer peripheral surface 33 in the fan suction direction X. Furthermore, the duct surrounding space 40 shown in FIG. 2 is formed on the rear side of the outer peripheral surface 33 (i.e., one side in a horizontal direction orthogonal to the fan suction direction X, that is, the lower side in FIG. 2). The duct surrounding space 40 is, however, not formed on the front side of the duct 30.

As shown in FIG. 1, the duct 30 is provided so as to facilitate the flow of the cooling air C from the duct 30 to the filter 27. Specifically, the opening at the distal end of the duct 30, namely, the lower end opening 37, is located on the outer side of the outer end of the filter 27 when viewed in the fan suction direction X. More specifically, the lower end opening 37 is disposed above the upper end of the filter 27. At least a downstream portion (e.g., a downstream end) of the duct lower end opening 37 in the fan suction direction X is disposed above the upper end of the filter 27. Preferably, the entire duct lower end opening 37 is disposed above the upper end of the filter 27. The length L of the duct 30 in the duct extension direction 30 (i.e., the vertical distance from the duct upper end opening 35 to the duct lower end opening 37) is, for example, 0.2 m or more and 0.3 m or less.

The duct 30 is provided so as to facilitate the flow of the cooling air C in the duct 30 and so as to be apt to transmit sound to the duct surrounding space 40. Specifically, when viewed in the duct extension direction 30 (i.e., in the vertical direction) as shown in FIG. 2, the cross-sectional area of the duct passage 32 enclosed by the duct 30 is equal to the area of the air intake opening 17. More specifically, when viewed vertically, the cross-sectional area of a space enclosed by the inner peripheral surface 31 of the duct 30 remains constant from the duct upper end opening 35 to the duct lower end opening 37. When viewed vertically, the cross-sectional shape and position of the inner peripheral surface 31 preferably coincides with the shape and position of the air intake opening 17, respectively.

The fan 21 is rotated to thereby generate the cooling air C as shown in FIG. 1. The cooling air C flows through the outside of the engine compartment 10, the air intake opening 17, the duct 30, the intake chamber 13, the filter 27, and the main chamber 11 in this order. The cooling air C having been introduced into the main chamber 11 flows through the radiator body 25c of the radiator 25, the fan 21, piping above the engine 23, the exhaust opening 19, and the outside of the engine compartment 10 in this order.

Figure 3:
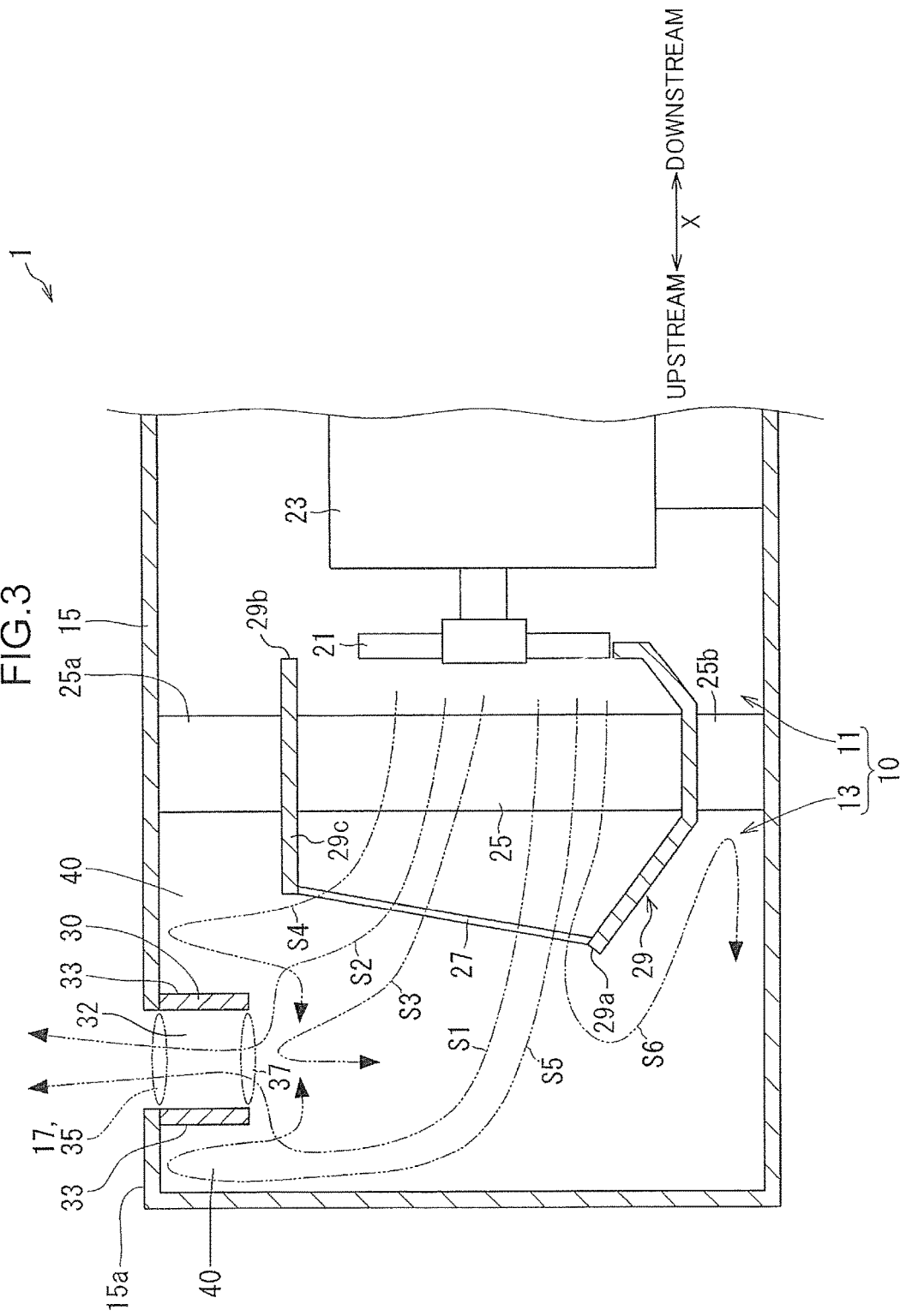
FIG. 3 is an enlarged cross-sectional view of a main part of the engine compartment.

The operation of the fan 21 involves generation of sound. The sound is sequentially transmitted to the fan 21, the radiator 25, the filter 27, and the intake chamber 13 in this order, as shown in FIG. 3. The cross-sectional area of the sound path from the main chamber 11 to the intake chamber 13 is sharply increased at the position of the filter 27 to bring the sound into diffraction (dispersion). As indicated by arrow S1 and arrow S2, a part of the sound transmitted to the intake chamber 13 passes through the duct 30 and the air intake opening 17 to be emitted out of the engine compartment 10.

As indicated by arrow S3, the cross-sectional area of the sound path, which passes through the filter 27, the intake chamber 13, and the peripheral portion of the duct 30 in this order, is sharply decreased at the lower end opening 37 which is an inlet of sound into the duct 30, thereby bringing the sound into reflection at the lower end opening 37 and therearound. The thus reflected sound interferes with other sound having different phase from that of the reflected sound, thereby generating noise suppression effect. In contrast, a duct whose cross-sectional area of the sound path decreases only gradually as the duct approaches the air intake opening from the intake chamber as shown in FIG. 1 of Patent Literature 1 is unable to generate sound reflection at the inlet of the duct, thus failing to achieve noise suppression effect due to the reflection.

As indicated by arrow S4 and arrow S5 in FIG. 3, sound having entered the duct surrounding space 40, that is, sound transmitted to the air in the duct surrounding space 40, is reflected by the walls surrounding the duct surrounding space 40. Specifically, the sound having entered respective spaces of the duct surrounding space 40, the spaces being upstream and downstream of the duct 30 in the fan suction direction X, respectively, is reflected by the wall portion 15, in particular, by the intake-chamber top wall portion 15a, the partition section 25a, etc. The thus reflected sound interferes with other sound having different phase from that of the reflected sound, thereby generating noise suppression effect. Thus, forming the duct surrounding space 40 around the duct 30, the duct 30 can be regarded as providing an interference type noise-suppression device (specifically, a device similar to a side branch). In contrast, the technique shown in FIG. 1 of Patent Literature 2, which does not generate the reflection indicated by the arrow S5, is unable to achieve the noise suppression effect due to the reflection.

As indicated by arrow S6 in FIG. 3, the sound having been transmitted to a space of the intake chamber 13, the space being below the filter 27 and downstream in the fan suction direction X, is reflected by walls enclosing the space, for example, the wall portion 15, the partition section 25b of the radiator 25, and the lower surface of the air guide member 29. The thus reflected sound interferes with other sound having different phase from that of the reflected sound, thereby generating noise suppression effect. Thus, forming the space of the intake chamber 13 below the air guide member 29, the air guide member 29 can be regarded as providing an interference type noise-suppression device (specifically, a device similar to a side branch).

(Comparison of Noise Reduction Effect)

Figure 4:
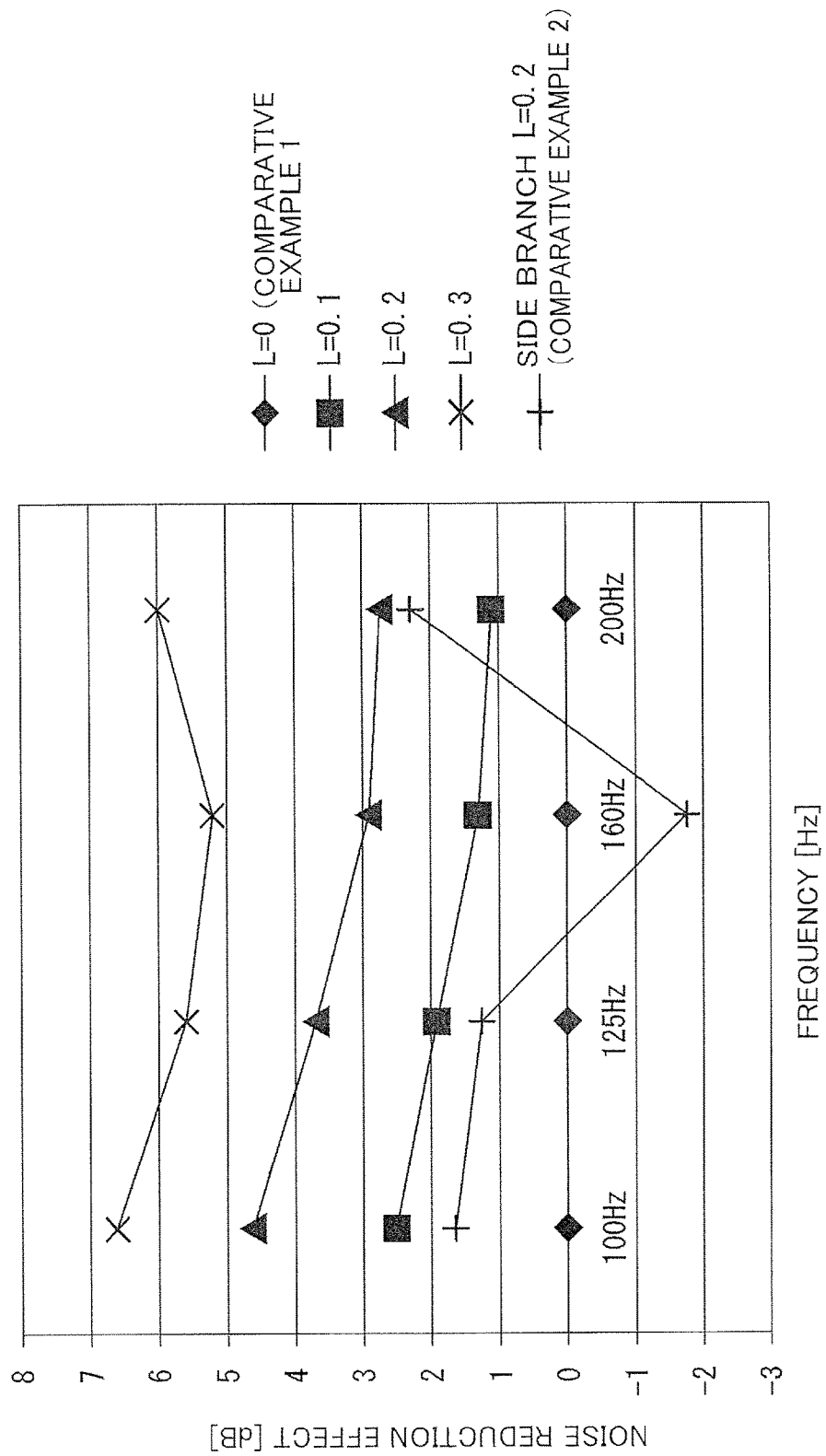
FIG. 4 is a graph showing a relationship between noise reduction effect and frequency.

FIG. 4 shows respective noise reduction effects (dB) at frequencies from 100 Hz to 200 Hz in various intake structures. FIG. 4 shows respective noise reduction effects in three types of structures in which respective ducts 30 have lengths L of 0.1 m, 0.2 m, and 0.3 m according to the first embodiment, that is, structures according to Example, a structure according to Comparative Example 1, and a structure according to Comparative Example 2. The structure according to Comparative Example 1 is the same as the structure according to Example 1 except for the point of not including the duct 30, that is, except for that the duct length L according to Comparative Example 1 is zero. The structure according to Comparative Example 2 is a structure based on the structure according to Example 1, including a conventional side branch having a length L of 0.2 in, which is provided to the air intake opening 17 instead of the duct 30 in the structure according to Example 1.

FIG. 4 is a graph showing, relatively to the reduction effect of the structure according to Comparative Example 1 as a reference (0 dB), respective reduction effects of other structures. This graph exposes that the structure according to Example 1 exerts a significant reduction effect on low frequency sound. Besides, the comparison of the structure of Example 1 whose length L of 0.2 in with the structure according to Comparative Example 2 teaches that the simple side branch according to Comparative Example 2 has little or no noise suppression effect even with the length of 0.2 m thereof, whereas the duct 30 according to Example 1, having a length of 0.2 m, can exert a significant noise suppression effect. This effect is probably based on the superposition of the effect due to the sharp expansion and sharp reduction of the flow path cross-sectional area at the respective filter 27 and the duct lower end opening 37 and the effect due to the side branch formed in the duct surrounding space 40. Details of the effect are as follows.

Figure 5:
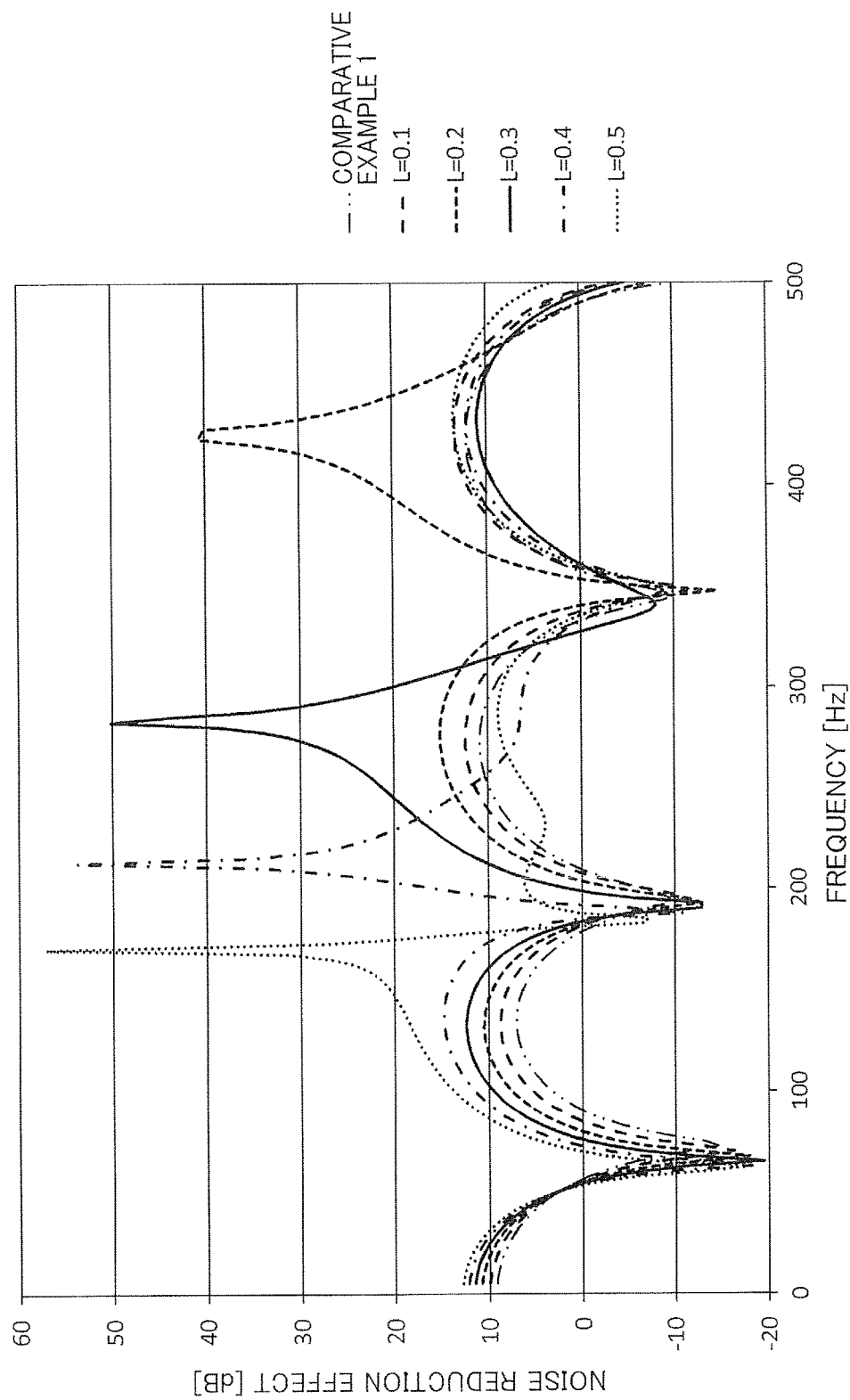
FIG. 5 is a graph showing a relationship between noise reduction effect and frequency.

FIG. 5 shows respective noise reduction effects (dB) at frequencies from 0 Hz to 500 Hz in various intake structures. FIG. 5 shows respective reduction effects in structures according to Example 1, that is, five types of structures in which lengths L of ducts 30 are 0.1 m, 0.2 in, 0.3 m, 0.4 in, and 0.5 m, and in the structure according to Comparative Example 1 (in which L=0 m) described above. The length L of the duct 30 shown in FIG. 1 is also the length of the side branch formed in the duct surrounding space 40. The structure of Comparative Example 1, in which the length L of the duct 30 is 0 m, can be regarded as having no side branch. The reduction effect of Comparative Example 1 shown in the graph of FIG. 5, therefore, can be regarded as one based on only the sharp expansion and sharp reduction of the cross-sectional area described above. As compared to the structure according to Comparative Example 1, the structure according to Example 1 exerts a remarkable reduction effect at a specific (narrow, pinpoint) frequency and furthermore exerts a high reduction effect in almost the entire low frequency range (from about 100 Hz to about 200 Hz).

As described above, in the structure according to the first embodiment, the cross-sectional area of the sound path, which passes through the fan 21, the filter 27, the intake chamber 13, and the duct 30 in this order, is sharply increased at the filter 27 and sharply reduced at the duct lower end opening 37, as shown in FIG. 3. This allows the sound to be reflected at the lower end opening 37 of the duct 30 (see arrow S3). Besides, in the structure, the interference between the reflected sound (see arrows S3, S4, and S5), which is a sound that enters the duct surrounding space 40 and is reflected by the walls constituting the intake chamber 13, and the sound having a phase different from that of the reflected sound generates the noise suppression effect particularly on low frequency sound (from about 100 Hz to about 200 Hz), which allows noise to be prevented from being emitted to the outside of the engine compartment 10 through the air intake opening 17. In addition, the structure according to the first embodiment achieves the noise suppression effect on the low frequency sound in a compact configuration as compared to the structure according to Example 2, that is, the structure not including the duct 30 nor the duct surrounding space 40 but only including a simple side branch provided in the vicinity of the air intake opening 17.

The duct 30 according to the first embodiment, which extends in a direction different from the fan suction direction X from the air intake opening 17 formed on a side of the intake chamber 13 toward the inside of the intake chamber 13, makes the sound (including high frequency sound exceeding 200 Hz) transmitted from the main chamber 11 to the intake chamber 13 be apt to come to the duct 30, thereby restricting noise from being emitted directly to the outside of the engine compartment 10 through the air intake opening 17.

Besides, the structure according to the first embodiment requires no active control to reduce noise. The active noise control involves a lot of problems: a significant limitation of frequencies at which the noise suppression effect can be achieved; increased costs and space constraints due to the addition of equipment to a conventional construction machine; heat damage; durability; weather resistance and others, whereas the aforementioned structure not requiring the active control involves none of the above problems.

Furthermore, the duct passage 32 which the duct 30 according to the first embodiment encloses, having a cross-sectional area equal to the area of the air intake opening 17 when viewed in the duct extension direction 30, allows the noise suppression effect due to the sound reflected in the duct surrounding space 40 to be reliably achieved and facilitates securing the flow rate of the cooling air C. If the duct passage 32 which the duct 30 encloses has a larger cross-sectional area than the area of the air intake opening 17, the duct 30 may hinder sound from entering the duct surrounding space 40 to thereby reduce the reflected sound (see arrow S4 and arrow S5) in the duct surrounding space 40 and lower the noise suppression effect due to the interference. If the duct passage 32 which the duct 30 encloses has a smaller cross-sectional area than the area of the air intake opening 17, the duct 30 may provide air flow resistance to the cooling air C to reduce the flow rate of the cooling air C.

The distal opening of the duct 30, namely, the lower end opening 37, being located on the outer side of the inlet end 29a of the air guide member 29 enclosing the inter-chamber opening when viewed in the fan suction direction X, smooths inflow of the cooling air C from the duct 30 to the filter 27 to thereby facilitate securing the flow rate of the cooling air C.

The duct 30 according to the first embodiment, which extends in a direction orthogonal to the fan suction direction X, makes the sound transmitted from the main chamber 11 to the intake chamber 13 be apt to come to the duct 30, thereby more effectively restricting noise from being emitted out of the engine compartment 10.

Figure 6:
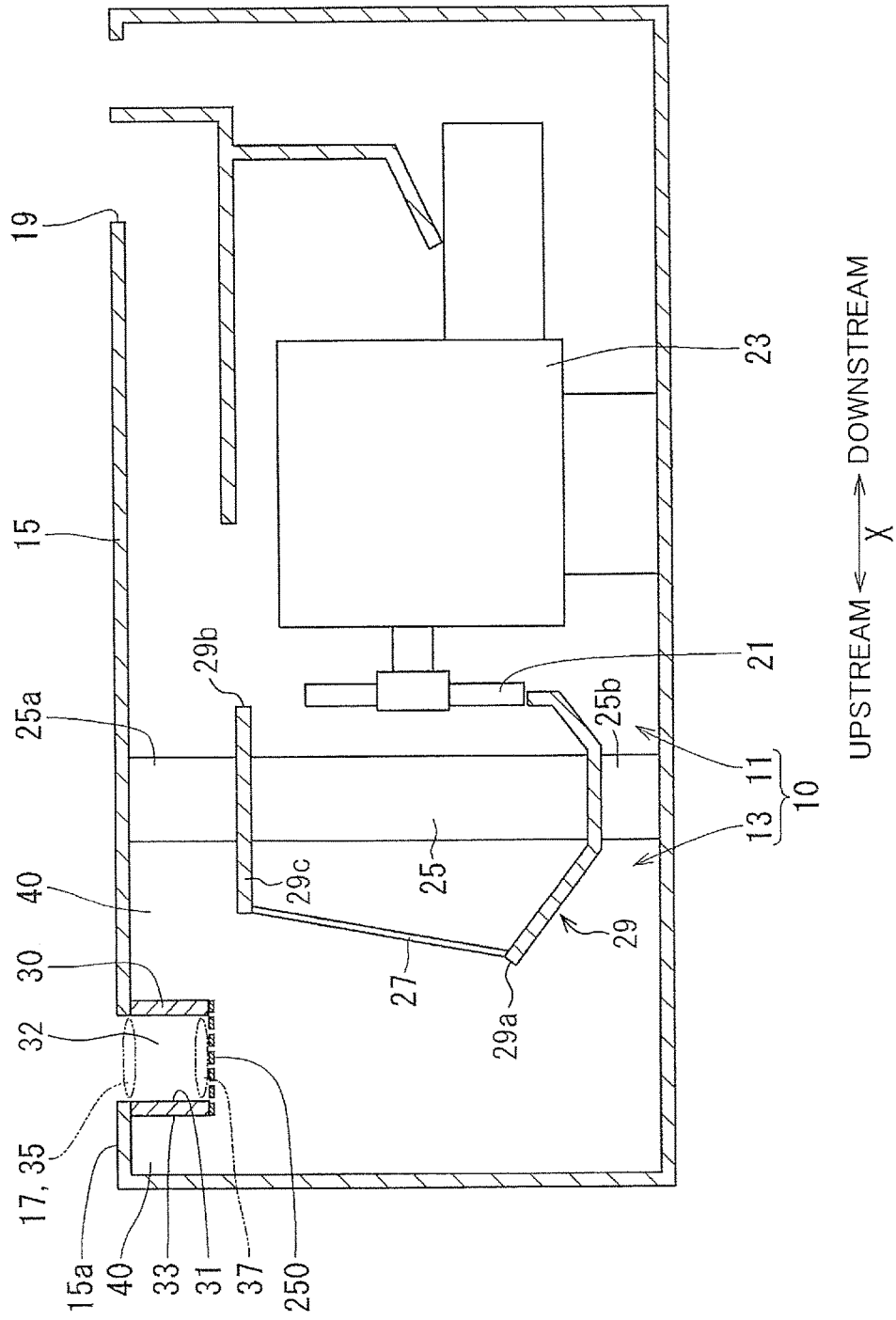
FIG. 6 is a cross-sectional view of a structure in an engine compartment of a construction machine according to a second embodiment of the present invention as seen horizontally.

FIG. 6 shows a main structure of a construction machine according to a second embodiment. Below will be described the difference between the above structure and the structure according to the first embodiment shown in FIG. 1. The elements of the structures according to the second embodiment and subsequent embodiments may include common elements to those of the structure according to the first embodiment, the common elements being given the same reference numerals as those in the first embodiment and excluded from the description.

The structure according to the second embodiment includes a perforated member 250, which is a vent member not included in the first embodiment. The perforated member 250 according to the second embodiment is a planar (plate-shaped) member including numerous holes and has air permeability. The perforated member 250 is made of a material such as metal, for example, a punching metal, or a wire mesh. The perforated member 250 is attached to the duct 30 so as to cover at least a part, preferably the whole, of the lower end opening 37 of the duct 30. The perforated member 250 exerts a flow straightening effect. The air having passed through the holes of the perforated member 250 forms air vortexes in the vicinity of the holes to cause sound energy to be dissipated (i.e., to generate small attenuation). The perforated member 250 reduces noise having a given frequency. The duct 30 may increase the noise having a specific frequency. For example, the duct 30 may increase noise at 500 Hz if having a length L of 0.2 in and may increase noise at 315 Hz if having a length L of 0.4 m. As measure against this, the diameter (e.g., about 5 mm or more) of the hole and the open area ratio (e.g., 30% or more) of the perforated member 250 in the second embodiment are set to reduce the noise having the frequency ath which the noise is increased by the duct 30.

The perforated member 250 dissipates the energy of sound passing through the perforated member 250, thereby suppressing the noise emitted out of the engine compartment 10 through the air intake opening 17.

Figure 7:
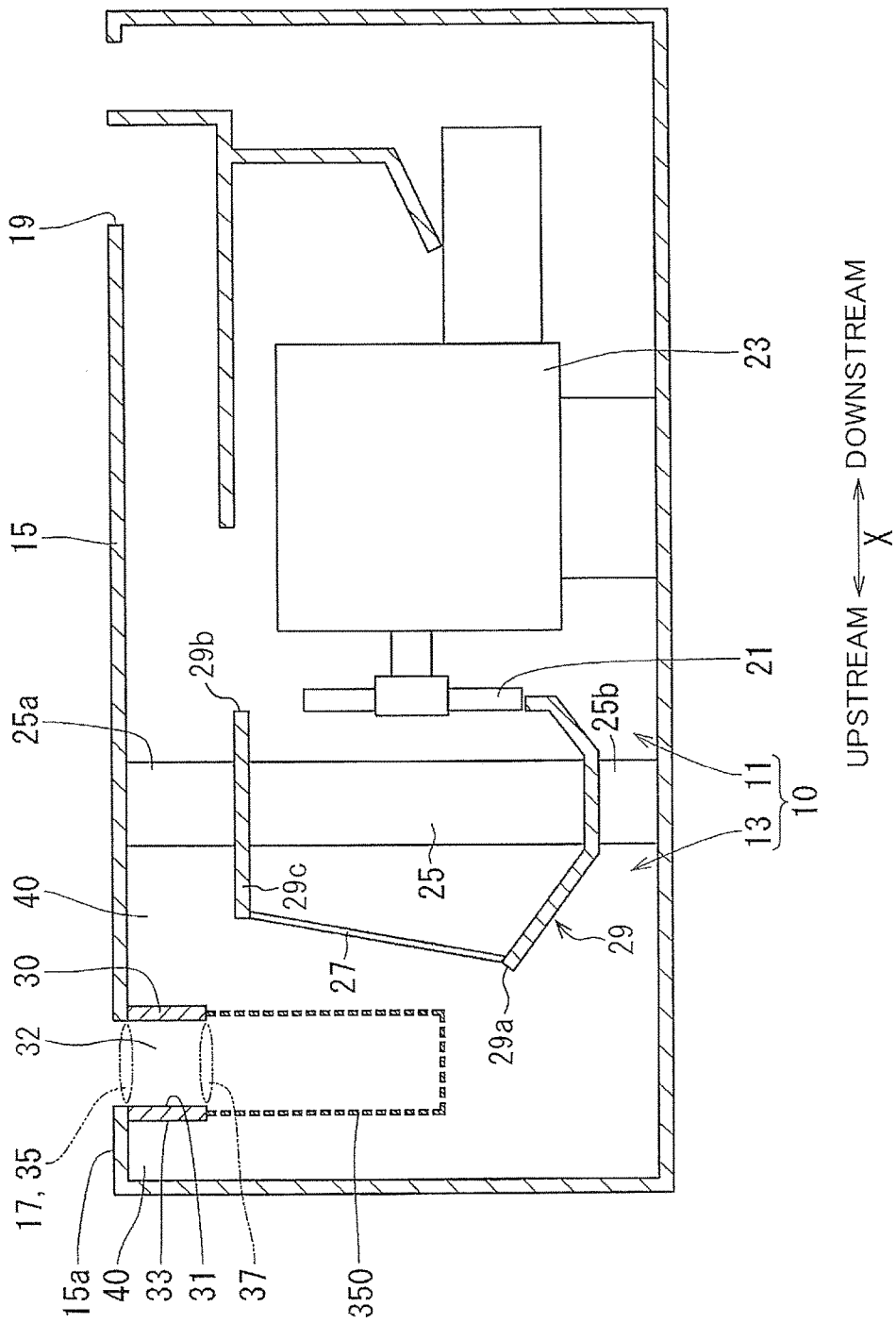
FIG. 7 is a cross-sectional view of a structure in an engine compartment of a construction machine according to a third embodiment of the present invention as seen horizontally.

FIG. 7 shows a main structure of a construction machine according to a third embodiment of the present invention. The third embodiment also includes a perforated member 350. However, differently from the planar perforated member 250 according to the second embodiment shown in FIG. 6, the perforated member 350 according to the third embodiment projects outward beyond the duct 30 from the distal opening of the duct 30: more specifically, the perforated member 350 has a three-dimensional shape projecting beyond the lower end opening 37 of the duct 30 downward, that is, in the duct extension direction 30. The perforated member 350 has, for example, a cylindrical shape projecting straight downward. This three-dimensional shape enables the perforated member 350 to have a total open area larger than the area of the lower end opening 37 of the duct 30.

Thus increasing the total open area of the holes included in the perforated member 30 enables the perforated member 350 to have reduced air flow resistance to the cooling air C to facilitate securing flow rate of the cooling air C.

Figure 8:
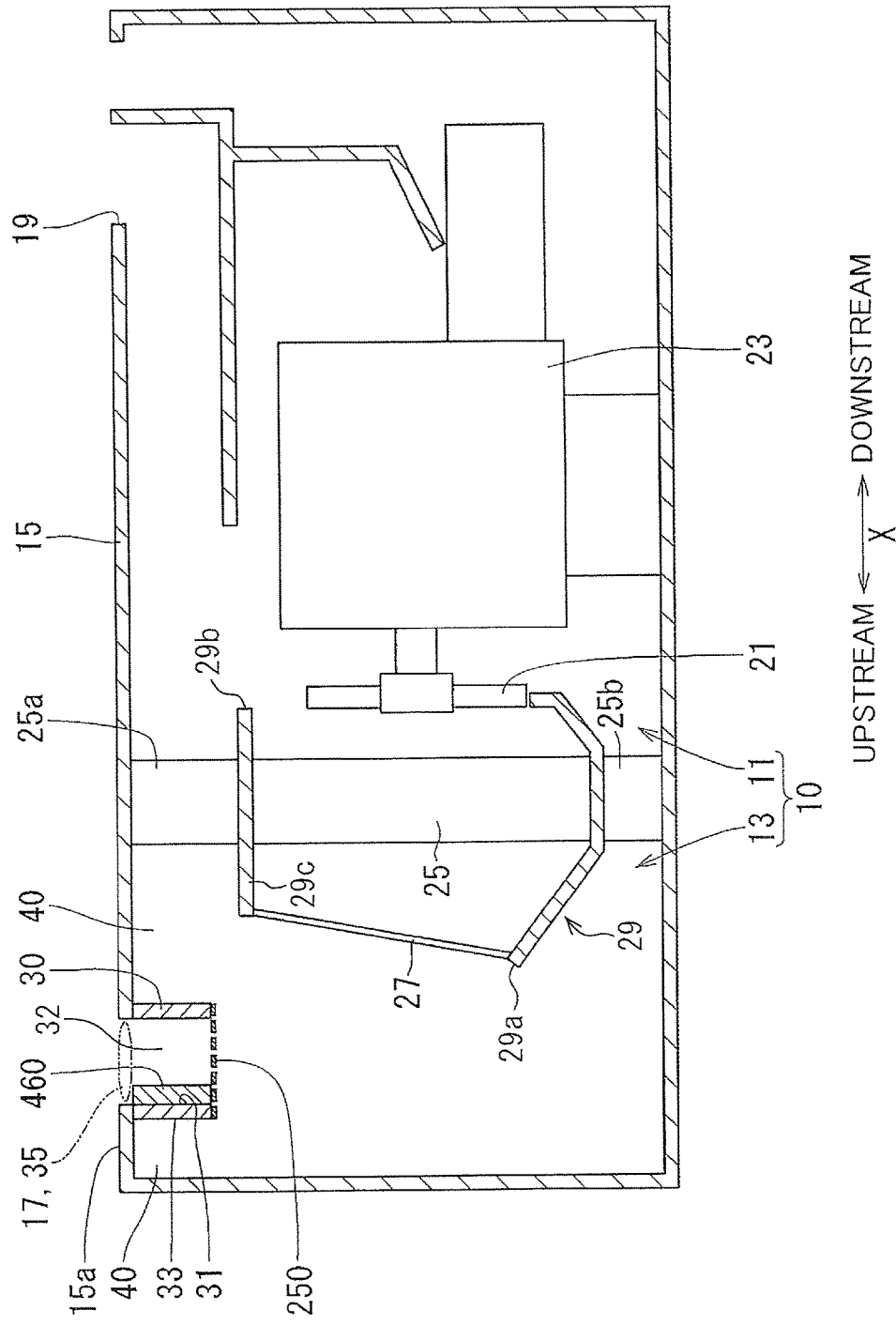
FIG. 8 is a cross-sectional view of a structure in an engine compartment of a construction machine according to a fourth embodiment of the present invention as seen horizontally.

FIG. 8 shows a main structure of a construction machine according to a fourth embodiment of the present invention. This structure further includes a sound absorber 460 in addition to the perforated member 250 included in the second embodiment. The sound absorber 460 absorbs sound having come thereto, in particular, high frequency sound, thereby suppressing, for example, wind noise generated in the perforated member 250. The sound absorber 460 is disposed so as to cover at least a part of the inner peripheral surface 31 of the duct 30. The sound absorber 460 is fixed (e.g., brought into adherence), for example, to an upstream portion of the inner peripheral surface 31 with respect to the fan suction direction X. The sound absorber 460 is formed of, for example, a porous material (i.e., urethane, glass wool, etc.).

(Fifth Embodiment)

Figure 9:
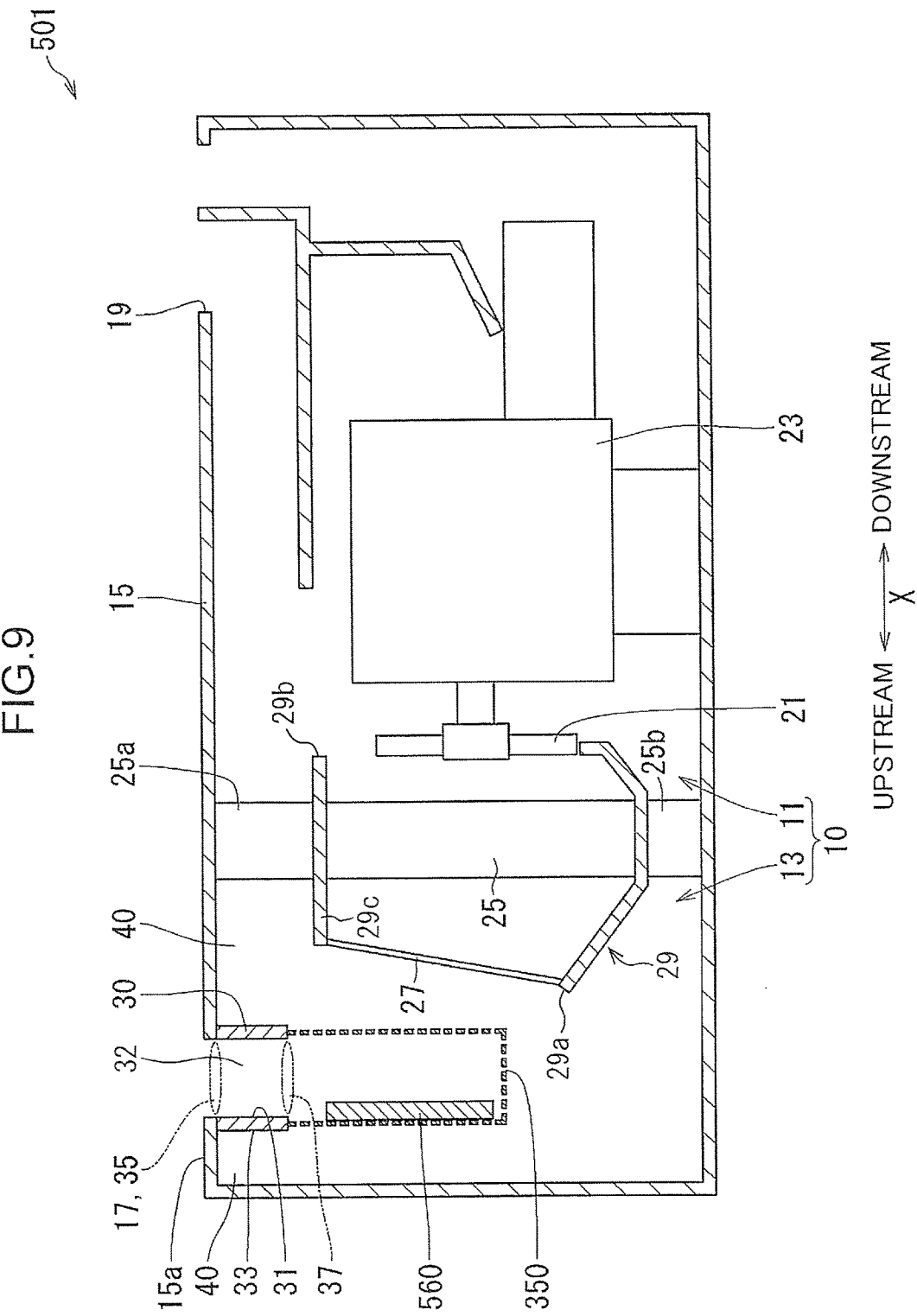
FIG. 9 is a cross-sectional view of a structure in an engine compartment of a construction machine according to a fifth embodiment of the present invention as seen horizontally.

FIG. 9 shows a main structure of a construction machine according to a fifth embodiment of the present invention. This structure differs from the structure according to the fourth embodiment shown in FIG. 8 in the following. The sound absorber 460 according to the fourth embodiment is disposed so as to cover the inner peripheral surface 31 of the duct 30, whereas a sound absorber 560 according to the fifth embodiment is disposed so as to cover the inner peripheral surface of the perforated member 350 projecting into the intake chamber 13 from the lower end opening 37 of the duct 30 similarly to the perforated member 350 shown in FIG. 7. The sound absorber 560 is disposed so as to be restrained from providing air flow resistance to the cooling air C (see FIG. 1) flowing from the perforated member 350 to the filter 27. Specifically, the sound absorber 560 is fixed (e.g., brought into adherence) to an upstream portion of the inner peripheral surface of the perforated member 350 with respect to the fan suction direction X so as to cover the upstream portion. The sound absorber 560 allows the low frequency sound to pass through the sound absorber 560, thereby effectively restricting the sound absorber 560 itself from inhibiting the entry of the low frequency sound into the duct surrounding space 40.

Also in the structure shown in FIG. 9, the sound absorber 560 fixed to the perforated member 350 is able to prevent sound having come to the sound absorber 460, for example, wind noise generated in the perforated member 350, from leaking out of the engine compartment 10.

Figure 10:
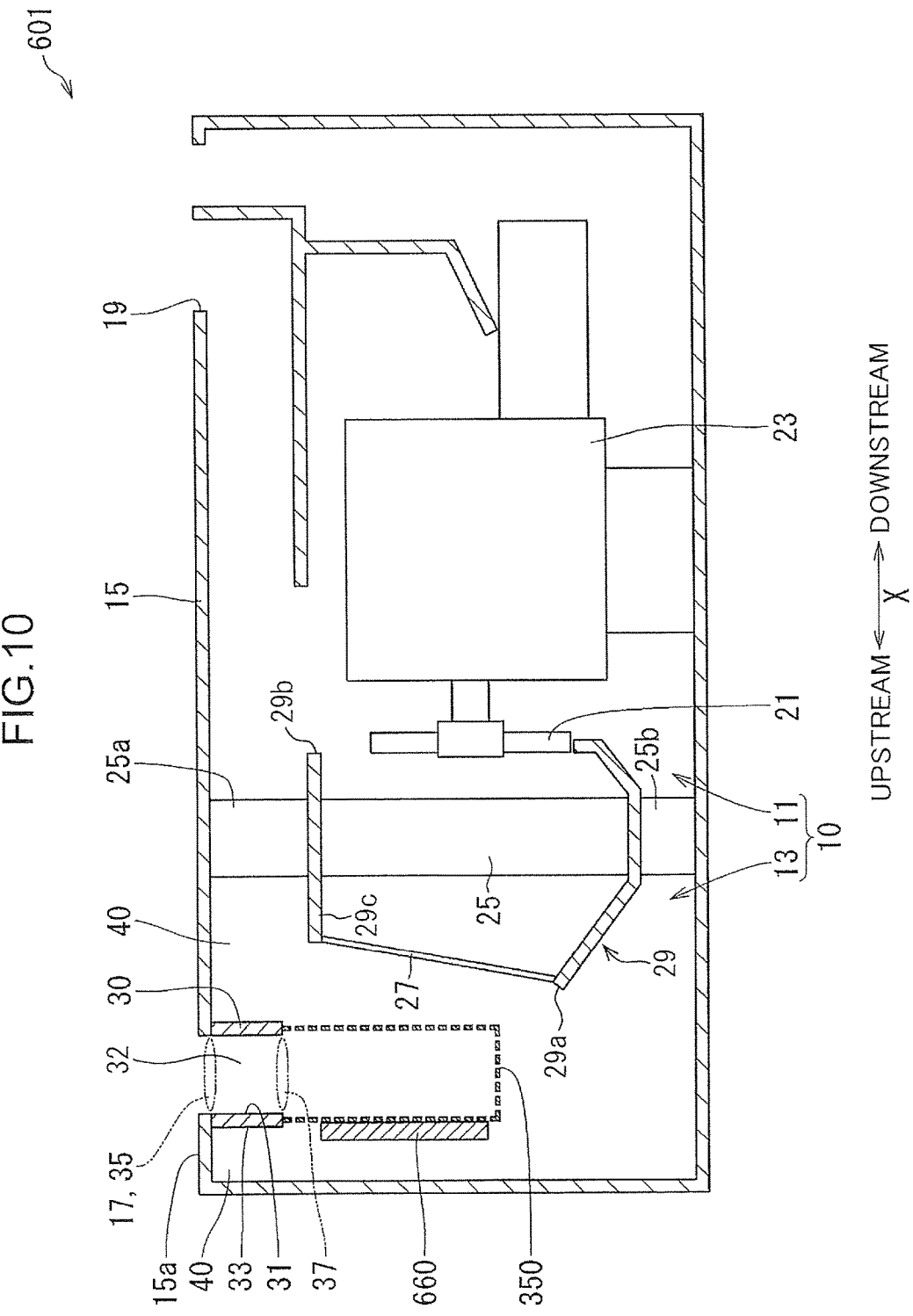
FIG. 10 is a cross-sectional view of a structure in an engine compartment of a construction machine according to a sixth embodiment of the present invention as seen horizontally.

FIG. 10 shows a main structure of a construction machine according to a sixth embodiment of the present invention. This structure differs from the structure according to the fifth embodiment shown in FIG. 9 only in the following respects. The sound absorber 560 according to the fifth embodiment covers the inner peripheral surface of the perforated member 350, whereas a sound absorber 660 of the sixth embodiment is fixed to the outer peripheral surface of the perforated member 350 so as to cover the outer peripheral surface and not mounted on the inner peripheral surface. Specifically, the sound absorber 660 is disposed so as to cover an upstream portion of the outer peripheral surface of the perforated member 350 with respect to the fan suction direction X. The thus disposed sound absorber 660 does not block the flow path of the cooling air C (see FIG. 1) in the perforated member 350 nor the flow path of the cooling air C from the perforated member 350 to the filter 27, thus facilitating securing the flow rate of the cooling air C. In addition, the sound absorber 660 can be disposed by effective utilization of a dead space upstream of the perforated member 350.

Figure 11:
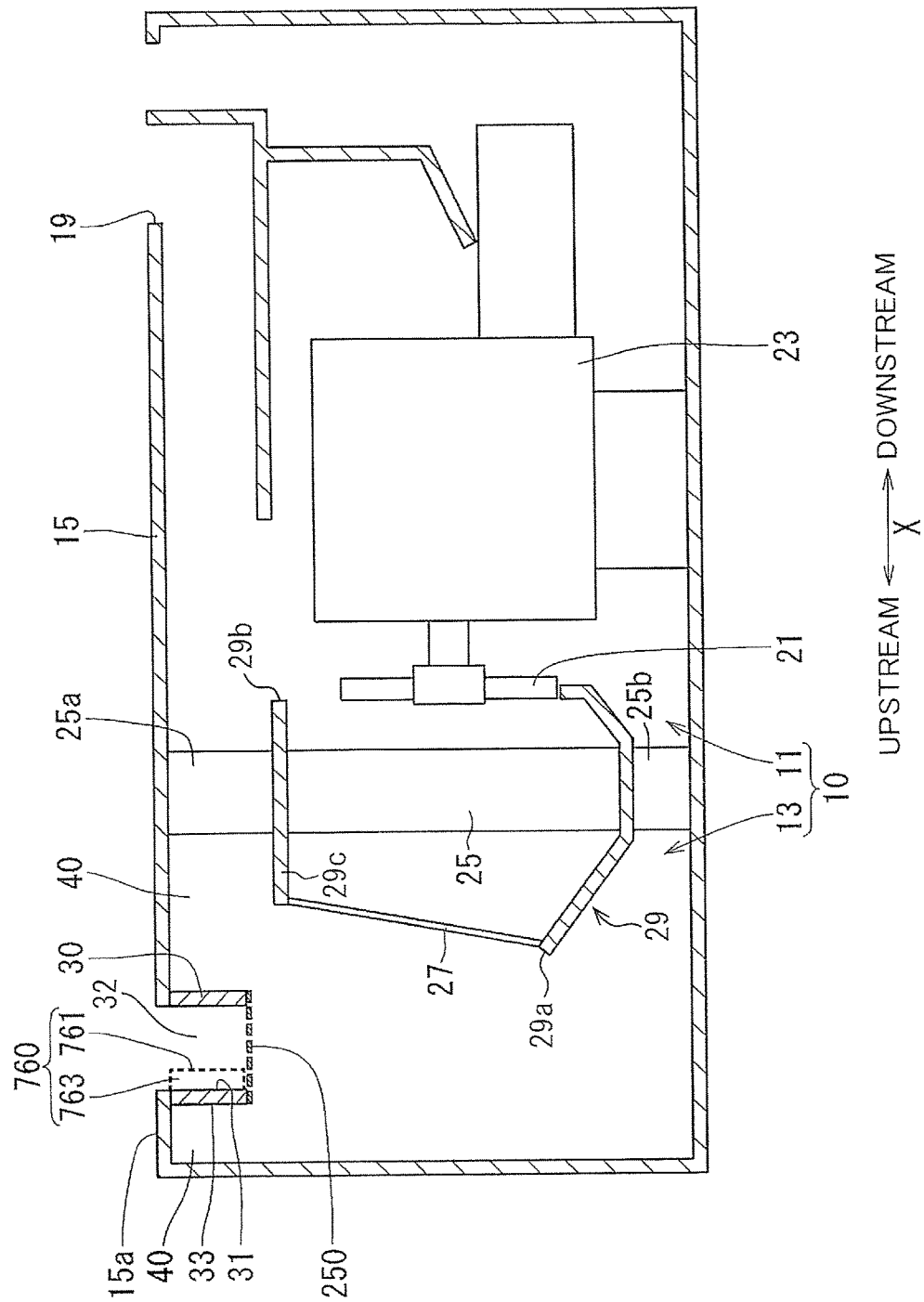
FIG. 11 is a cross-sectional view of a structure in an engine compartment of a construction machine according to a seventh embodiment of the present invention as seen horizontally.

FIG. 11 shows a main structure of a construction machine according to a seventh embodiment of the present invention. This structure differs from the structure according to the fourth embodiment shown in FIG. 8 only in the following respects. The structure according to the seventh embodiment includes a sound absorber 760 constituted by a perforated plate 761 and an air layer 763, instead of the sound absorber 460 according to the fourth embodiment, i.e., the sound absorber formed of the porous material. The perforated plate 761 is a plate having numerous holes. The perforated plate 761 is formed of a material such as painted metal, aluminum, or aluminum alloy so as to suppress its deterioration due to rainwater and the like. The diameter of the holes and the open area ratio in the perforated plate 761 are set so as to allow wind noise generated in the perforated member 250 to be suppressed. For example, preferable diameter of each hole is about 3 mm or less, and preferable open area ratio is about 3% or less. The air layer 763 is an air layer formed between the perforated plate 761 and the inner peripheral surface 31 of the duct 30, that is, a space or a gap in which no solid matter is present. The thus configured sound absorber 760 is less likely to deteriorate due to rainwater and the like than a sound absorber formed of a porous material such as urethane.

The above embodiment can be modified in various ways. For example, components including in different embodiments may be combined. For example, the structure according to the fourth embodiment shown in FIG. 8, in which the sound absorber 460 is disposed so as to cover the inner peripheral surface 31 of the duct 30, can be added with the sound absorber 660 attached to the perforated member 350 as in the sixth embodiment shown in FIG. 10.

It is also possible to suitably modify shapes of components of the above embodiments. For example, instead of the air intake opening 17 having a trapezoidal shape when viewed from above as shown in FIG. 2, can be replaced with an air intake opening formed into a rectangular shape, or a polygonal shape other than a quadrangle, or a shape enclosed by a line including a curve, when viewed from above.

The number of components in the above embodiments also can be changed. For example, a plurality of air intake openings 17 and a plurality of ducts 30 may be provided at respective positions in the wall portion 15.

Alternatively, some of the components in the above embodiments can be omitted. For example, the filter 27 shown in FIG. 1 is not necessarily provided. In the case without it, what corresponds to the inter-chamber opening providing communication between the main chamber 11 and the intake chamber 13 is an opening enclosed by the inlet end 29a of the air guide member 29.

The air intake opening according to the present invention is not limited to one formed in the intake-chamber top wall portion 15a like the air intake opening 17. The air intake opening may be formed, for example, in a bottom wall defining the bottom of the intake chamber or a side wall defining the side of the intake chamber (e.g., the right side, left side, rear, or front of the construction machine), or in the vicinity of the bottom wall or the side wall.

The duct according to the present invention is not limited to one extending downward from the air intake opening 17 like the duct 30. For example, the duct may extend obliquely from the air intake opening 17. The duct may extend laterally, upwardly, or obliquely upward from the air intake opening, depending on the position of the air intake opening.

Figure 12:
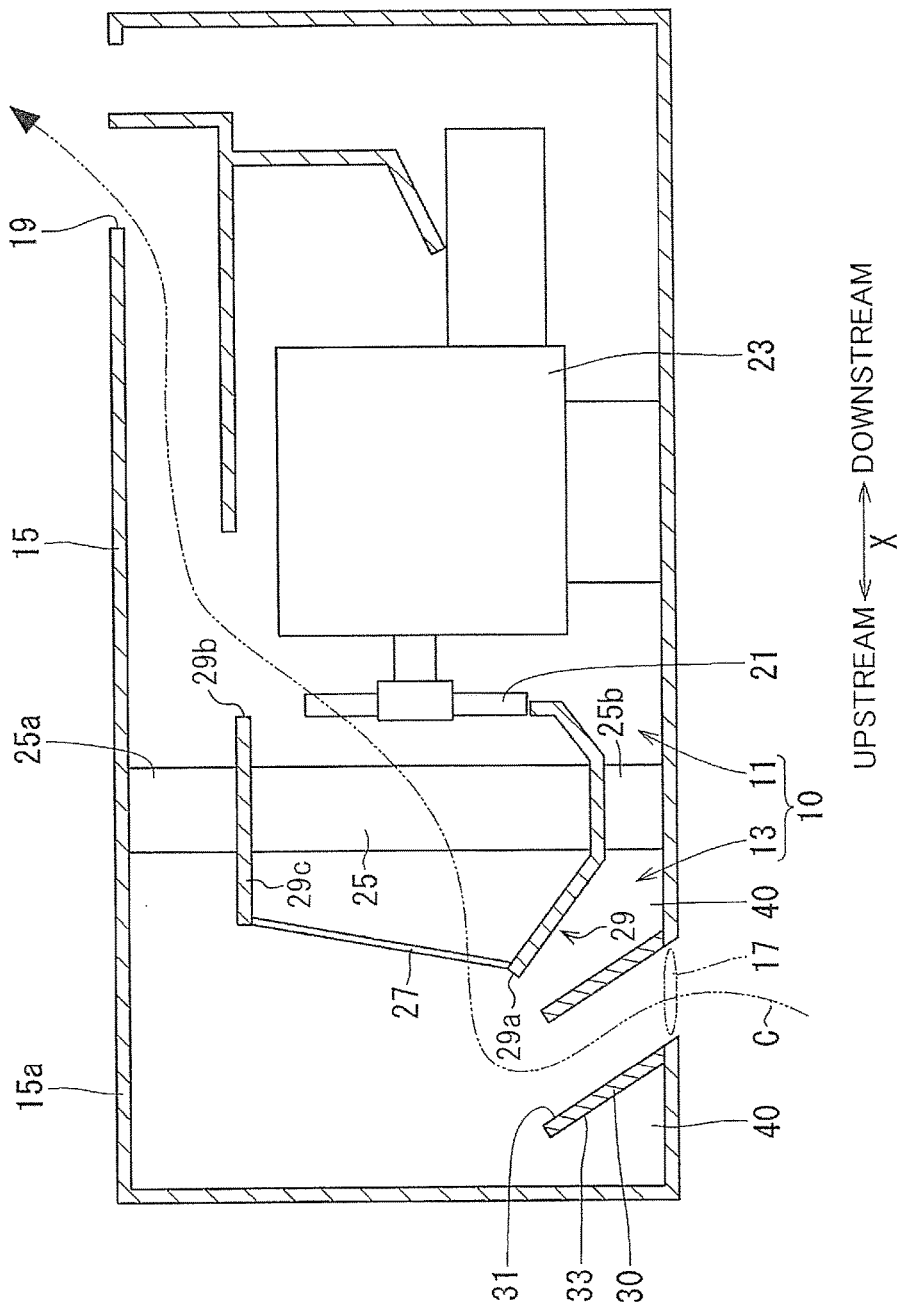
FIG. 12 is a cross-sectional view of a structure in an engine compartment of a construction machine according to an eighth embodiment of the present invention as seen horizontally.

As an example, FIG. 12 shows a main structure of a construction machine according to an eighth embodiment of the present invention. This eighth embodiment also includes an air intake opening 17, but the air intake opening 17 is formed in a bottom wall defining the bottom of the intake chamber 13. The duct 30 extends in a direction intersecting with the fan suction direction X, specifically, in an obliquely upward direction in the eighth embodiment. More specifically, the duct 30 extends upward with increase in the distance between the duct 30 and the main chamber 11.

While the duct surrounding space 40 according to the embodiments is adjacent to only a portion of the outer peripheral surface 33 of the duct 30 as shown in FIG. 2, the duct surrounding space according to the present invention may be adjacent to the entire circumference of the outer peripheral surface of the duct.

While the length of the side branch formed in the duct surrounding space 40 is equal to the length L of the duct 30 in the above embodiments, these lengths may be different.

The cross-sectional area and the cross-sectional shape of the duct passage 32 in the duct 30 viewed from the duct extension direction 30, though being constant from the upper end opening 35 of the duct 30 to the lower end opening 37 in the above embodiments, may be inconstant.

The perforated member 350 shown in FIG. 7, though projecting in the duct extension direction 30 (i.e., downwardly) from the lower end opening 37 of the duct 30, may further project in a direction orthogonal to the duct extension direction 30 (e.g., in the fan suction direction X).

As described above, a construction machine is provided, including an engine compartment having an air intake opening and being capable of suppressing noise emitted out of the engine compartment through the air intake opening over a wide range of frequencies in a compact configuration. Provided is a construction machine capable of reducing noise emitted outward from the engine compartment through the air intake opening over a wide range of frequencies in a compact configuration. Provided is a construction machine including: an engine; an engine compartment that has an outer wall enclosing an accommodation space and accommodates the engine in the accommodation space; a partition member that partitions the accommodation space into a main chamber accommodating the engine and an intake chamber in communication with an outside of the outer wall through an air intake opening formed in the outer wall, the main chamber and the intake chamber being arranged in a horizontal chamber arrangement direction, the partition member having an inter-chamber opening that provides communication between the main chamber and the intake chamber and has a smaller area than an area of the intake chamber when viewed in the chamber arrangement direction; a fan disposed in the main chamber to suck air in the engine compartment in a suction direction so as to generate cooling air flowing through the air intake opening, the intake chamber, the inter-chamber opening, and the main chamber in this order; and a duct joined to the outer wall so as to enclose the air intake opening, the duct including an inner peripheral surface enclosing a duct passage leading to the air intake opening and an outer peripheral surface. The duct extends in a duct extension direction different from the suction direction and is disposed in the intake chamber so as to define a duct surrounding space around the outer peripheral surface of the duct.

According to this construction machine, the combination of the partition member that partitions the accommodation space into the main chamber and the intake chamber while having the inter-chamber opening and the duct that encloses the air intake opening of the intake chamber so as to define the duct surrounding space in the intake chamber makes it possible to suppress noise emitted out of the engine compartment through the air intake opening over a wide range of frequencies in a compact configuration.

Preferably, the duct passage has a cross-sectional area equal to a cross-sectional area of the air intake opening when viewed in the duct extension direction. This allows the noise suppression effect due to the sound reflected in the duct surrounding space to be reliably achieved and facilitates securing the flow rate of the cooling air.

Preferably, the duct has opposite ends in the duct extension direction, the opposite ends being a proximal end that encloses the air intake opening and a distal end that encloses a duct outlet on a side opposite to the proximal end, the distal end being located on an outer side of an outer end of the inter-chamber opening when viewed in the suction direction. This smooths the flow of the cooling air from the duct to the filter to facilitate securing the flow rate of the cooling air.

Preferably, the construction machine further includes a vent member covering the duct outlet and having air permeability allowing air to pass through the vent member. The perforated member dissipates the energy of sound passing through the vent member, thereby suppressing the noise emitted out of the engine compartment through the air intake opening.

Preferably, the vent member projects outward of the duct passage beyond the distal end of the duct. The projection of the vent member enables the vent area thereof, for example, the total open area of vent holes included in the vent member, to be increased, thereby decreasing the air flow resistance to the cooling air in the vent member to facilitate securing flow rate of the cooling air.

Preferably, the construction machine further includes a sound absorber disposed so as to cover at least one of the inner peripheral surface of the duct and the vent member. The sound absorber absorbs sound having come to the sound absorber to reduce, for example, wind noise generated in the vent member.

The preferable sound absorber is, for example, one fixed to an upstream portion of the outer peripheral surface of the vent member in the suction direction. Alternatively, also preferable is one disposed so as to cover the inner peripheral surface of the duct, including a perforated plate formed of metal and located at a position away from the inner peripheral surface inward of the duct and an air layer formed between the perforated plate and the inner peripheral surface of the duct.

Preferably, the duct extension direction is a direction orthogonal to the suction direction. This makes the sound transmitted from the main chamber be apt to come to the duct, thereby making it possible to more effectively suppress direct emission of noise out of the engine compartment.

The invention claimed is:

1. A construction machine comprising:
   an engine;
   an engine compartment that has an outer wall enclosing an accommodation space and accommodates the engine in the accommodation space, the outer wall being formed with an air intake opening;
   a partition member that partitions the accommodation space into a main chamber accommodating the engine and an intake chamber in communication with an outside of the outer wall through the air intake opening formed in the outer wall, the main chamber and the intake chamber being arranged in a horizontal chamber arrangement direction, the partition member having an inter-chamber opening that provides communication between the main chamber and the intake chamber and has a smaller area than an area of the intake chamber when viewed in the chamber arrangement direction;
   a fan disposed in the main chamber to suck air in the engine compartment in a suction direction so as to generate cooling air flowing through the air intake opening, the intake chamber, the inter-chamber opening, and the main chamber in this order; and
   a duct joined to the outer wall so as to enclose the air intake opening, the duct being a tubular member including an inner peripheral surface enclosing a duct passage leading to the air intake opening and an outer peripheral surface, the duct extending from the outer wall to an inside of the intake chamber in a duct extension direction intersecting with the suction direction, the outer peripheral surface of the tubular duct being disposed in the intake chamber so as to define a duct surrounding space around the outer peripheral surface of the duct over an entire circumference of the outer peripheral surface, the duct surround space being a part of the intake chamber,
   wherein the duct extension direction is a direction orthogonal to the suction direction.

2. The construction machine according to claim 1, wherein the duct passage has a cross-sectional area equal to a cross-sectional area of the air intake opening when viewed in the duct extension direction.

3. The construction machine according to claim 1, wherein the duct has opposite ends in the duct extension direction, the opposite ends being a proximal end that is joined to the outer wall to surround the air intake opening and a distal end that encloses a duct outlet on a side opposite to the proximal end, the distal end being located at a position apart from the outer wall in the duct extension direction and on an outer side of an outer end of the inter-chamber opening when viewed in the suction direction.

4. The construction machine according to claim 1, further comprising a vent member covering the duct outlet and having air permeability allowing air to pass through the vent member.

5. An intake structure for the construction machine according to claim 4, wherein the vent member projects outward of the duct passage beyond the distal end of the duct.

6. The construction machine according to claim 4, further comprising a sound absorber disposed so as to cover at least one of the inner peripheral surface of the duct and the vent member.

7. The construction machine according to claim 6, wherein the sound absorber is disposed so as to cover an upstream portion of the outer peripheral surface of the vent member in the suction direction.

8. A construction machine comprising:
   an engine;
   an engine compartment that has an outer wall enclosing an accommodation space and accommodates the engine in the accommodation space;
   a partition member that partitions the accommodation space into a main chamber accommodating the engine and an intake chamber in communication with an outside of the outer wall through an air intake opening formed in the outer wall, the main chamber and the intake chamber being arranged in a horizontal chamber arrangement direction, the partition member having an inter-chamber opening that provides communication between the main chamber and the intake chamber and has a smaller area than an area of the intake chamber when viewed in the chamber arrangement direction;
   a fan disposed in the main chamber to suck air in the engine compartment in a suction direction so as to generate cooling air flowing through the air intake opening, the intake chamber, the inter-chamber opening, and the main chamber in this order
   a duct joined to the outer wall so as to enclose the air intake opening, the duct including an inner peripheral surface enclosing a duct passage leading to the air intake opening and an outer peripheral surface, the duct extending in a duct extension direction different from the suction direction and being disposed in the intake chamber so as to define a duct surrounding space around the outer peripheral surface of the duct; and
   a sound absorber is disposed so as to cover the inner peripheral surface of the duct, including a perforated plate formed of metal and located at a position away from the inner peripheral surface inward of the duct and an air layer formed between the perforated plate and the inner peripheral surface of the duct.

9. A construction machine comprising:
   an engine;
   an engine compartment that has an outer wall enclosing an accommodation space and accommodates the engine in the accommodation space, the outer wall being formed with an air intake opening;
   a partition member that partitions the accommodation space into a main chamber accommodating the engine and an intake chamber in communication with an outside of the outer wall through the air intake opening formed in the outer wall, the main chamber and the intake chamber being arranged in a horizontal chamber arrangement direction, the partition member having an inter-chamber opening that provides communication between the main chamber and the intake chamber and has a smaller area than an area of the intake chamber when viewed in the chamber arrangement direction;

a fan disposed in the main chamber to suck air in the engine compartment in a suction direction so as to generate cooling air flowing through the air intake opening, the intake chamber, the inter-chamber opening, and the main chamber in this order;

a duct joined to the outer wall so as to enclose the air intake opening, the duct being a tubular member including an inner peripheral surface enclosing a duct passage leading to the air intake opening and an outer peripheral surface, the duct extending from the outer wall to an inside of the intake chamber in a duct extension direction intersecting with the suction direction, the outer peripheral surface of the tubular duct being disposed in the intake chamber so as to define a duct surrounding space around the outer peripheral surface of the duct over an entire circumference of the outer peripheral surface, the duct surround space being a part of the intake chamber; and a vent member covering the entire duct outlet when viewed in the duct extension direction while having air permeability allowing air to pass through the vent member.

10. An intake structure for the construction machine according to claim 9, wherein the vent member projects outward of the duct passage beyond the distal end of the duct in the duct extension direction.

11. The construction machine according to claim 9, further comprising a sound absorber disposed so as to cover at least one of the inner peripheral surface of the duct and the vent member.

12. The construction machine according to claim 11, wherein the sound absorber is disposed so as to cover an upstream portion of the outer peripheral surface of the vent member in the suction direction.

* * * * *